United States Patent [19]

Tam

[11] Patent Number: 5,754,460
[45] Date of Patent: May 19, 1998

US005754460A

[54] METHOD FOR PERFORMING SIGNED DIVISION

[75] Inventor: Hon-Kai John Tam, Sunnyvale, Calif.

[73] Assignee: National Semiconductor Corporation, Santa Clara, Calif.

[21] Appl. No.: 451,571

[22] Filed: May 26, 1995

[51] Int. Cl.$^6$ .................................................. G06F 7/52
[52] U.S. Cl. ........................................ 364/764; 364/766
[58] Field of Search ................................ 364/764, 766, 364/761

[56] References Cited

U.S. PATENT DOCUMENTS

| | | | |
|---|---|---|---|
| 4,224,676 | 9/1980 | Appelt | 364/712 |
| 4,381,550 | 4/1983 | Baker | 364/766 |
| 4,754,422 | 6/1988 | Sakai et al. | 364/761 |
| 5,027,309 | 6/1991 | Koumoto et al. | 364/766 |
| 5,097,435 | 3/1992 | Takahashi | 364/766 |
| 5,107,453 | 4/1992 | Nomura | 364/764 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |
| 5,493,523 | 2/1996 | Huffman | 364/766 |
| 5,574,677 | 11/1996 | Cohen | 364/766 |

OTHER PUBLICATIONS

Computer Design, Vo. 16, No. 5, May 1977, pp. 124–127 S. Sanyal "An Algorithm fo Nonrestoring Division".

K. Hwang p. 218–221 "Computer Arithmic: Principles, Architecture, and Design" 1979 J. Wiley & Sons, New York XP002015483.

Serra, Micaela & Dervisoglu, Bulent I, "Testing", Chapter 79, *The Electrical Engineering Handbook*, Richard C. Dorf, Editor–in–Chief, pp. 1808–1837, CRC Press. Date Unknown L–T Wang et al., "Feedback Shift Registers For Self–Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, and How", *Sharp Application Notes*, Sharp Corporation, 1994, pp. 2–1 thru 2–9.

Bernd Moeschen, "NS32SP160–Feature Communication Controller Architecture Specification", *National Semiconductor*, Rev. 1.0, May 13, 1993.

Agarwal, Rakesh K., *80x86 Architecture and Programming, vol. II: Architecture Reference*, Chapter 4, Prentice Hall, 1991, pp. 542–543.

(List continued on next page.)

*Primary Examiner*—Reba I. Elmore
*Assistant Examiner*—Robert J. Dolan
*Attorney, Agent, or Firm*—Limbach & Limbach LLP

[57] ABSTRACT

A method for signed integer division. Typically, the two's complement of the dividend is stored as an adjusted dividend. The upper half of the adjusted dividend is shifted left one bit. The LSB of the upper half of the adjusted dividend is set equal to the MSB of the lower half of the adjusted dividend. The lower half of the adjusted dividend is shifted left one bit. The LSB of the lower half of the adjusted dividend is set equal to zero. A temporary register stores the result of subtracting a constant from the adjusted divisor. The temporary register is updated by subtracting it from the adjusted upper dividend. The adjusted divisor is subtracted from the adjusted dividend, then the adjusted dividend is shifted left one bit and stored in the upper half of the adjusted dividend. A temporary remainder is set equal to the upper half of the adjusted dividend. A first temporary quotient is set equal to the lower half of the adjusted dividend. A second temporary quotient is set equal to the first temporary quotient if the sign of the dividend and divisor are equal; if not, the second temporary quotient is set equal to the complement of the first temporary quotient. If the dividend is negative, the remainder is set equal to the temporary remainder; if not, the remainder is set equal to the complement of the temporary remainder. The quotient is then set equal to the second temporary quotient.

1 Claim, 9 Drawing Sheets

OTHER PUBLICATIONS

Intel486 Microprocessor Family Programmer's Reference Manual, Intel Corporation, 1993.

"8237A High Perrformance Programmable DMA Controller (8237A, 8237A-4, 8237A-5)", *Peripheral Components*, Intel, 1992, pp. 3-14 thru 3-50.

Kane, Gerry, "R2000 Processor Programming Model", Chapter 2, *MIPS RISC Architecture*, MIPS Computer Systems, Inc. Date Unknown Hennessy, John, et al., "Interpreting Memory Addresses", *Computer Architecture A Quantitative Approach*, pp. 95-97, Morgan Kaufmann Publishers, Inc. 1990.

*PowerPC601 Reference Manual*, IBM, 1994, Chapter 9, "System Interface Operation", pp. 9-15 thru 9-17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3-28 thru 3-32. Date unknown

METHOD FOR PERFORMING SIGNED DIVISION

BACKGROUND OF THE INVENTION

The present invention relates generally to microprocessor architecture, and more particularly to the architecture of a microprocessor execution unit which performs arithmetic and logic operations concurrently with address computations.

Many modern microprocessors have a "pipelined architecture" whereby the processor is divided into stages. This permits the processor to perform several tasks at once thereby allowing the processor to work on different parts of the instructions simultaneously as they are advanced through the pipe with each clock cycle. Under ideal conditions, one instruction can leave the pipeline and another instruction enter the pipeline every clock cycle. One such microprocessor is the Intel486™ microprocessor. Compatible x86-type microprocessors include those made by Advanced Micro Devices and Cyrix.

Arising out of the need for compatibility with older Intel microprocessor designs and the fact that it is a general purpose microprocessor, the x86 microprocessor has a complex instruction set architecture which includes over 400 instructions. However, some of these instructions are rarely used by either the operating system or the compiler. Thus, it would be desirable to optimize the architecture for commonly used instructions.

As described in Chapter 2 of the "Intel486™ MICROPROCESSOR FAMILY PROGRAMMER'S REFERENCE MANUAL," the memory of an x86-type microprocessor is organized as a sequence of 8-bit bytes and each byte is assigned a unique physical address. However, application programs do not directly address the physical address, but instead use a virtual addressing scheme whereby the physical address is calculated based on a memory management model that includes segmentation and paging.

The physical memory is divided into independent memory spaces called segments. Each segment has a segment descriptor which contains its base address and a size limit for that segment. An application program issues a logical address which the addressing hardware translates into a linear address by adding an offset to the base address, so long as the offset does not exceed the size limit. The offset is the sum of three components, namely, a displacement value, a base register and an index register.

Paging is also supported by x86-type architecture, whereby linear address space, which may be part of physical memory or disk storage, is divided into 4 k blocks of memory called pages. If paging is employed, addressing hardware translates the linear address into a physical address. If not, the linear address is the same as the physical address.

Thus, x86-type addressing hardware must handle the worst case scenario, namely, wherein the effective address is the sum of the base and all offset components. However, in many applications, only one offset component is present. Therefore, it would also be desirable to optimize the addressing hardware to handle the usual rather than the worst case addressing computation.

SUMMARY OF THE INVENTION

An architecture for a microprocessor execution unit is disclosed. The architecture is generally described as having an arithmetic unit and an addressing unit. The arithmetic unit performs arithmetic and logical operations on a pair of operands in response to control signals. The addressing unit operates in conjunction with the arithmetic unit to calculate linear addresses as well as offsets and limits.

The arithmetic unit includes a first portion for performing addition, subtraction and logical operations, a second portion for performing multiply, divide and single-bit shift operations, and a third portion for performing multi-bit shift and rotate operations.

The addressing unit is coupled to the output of the arithmetic unit. When an addressing instruction is received, the base component is input to the addressing unit and the index and displacement components are input to the arithmetic unit. The results are summed in a single cycle to yield a linear address.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
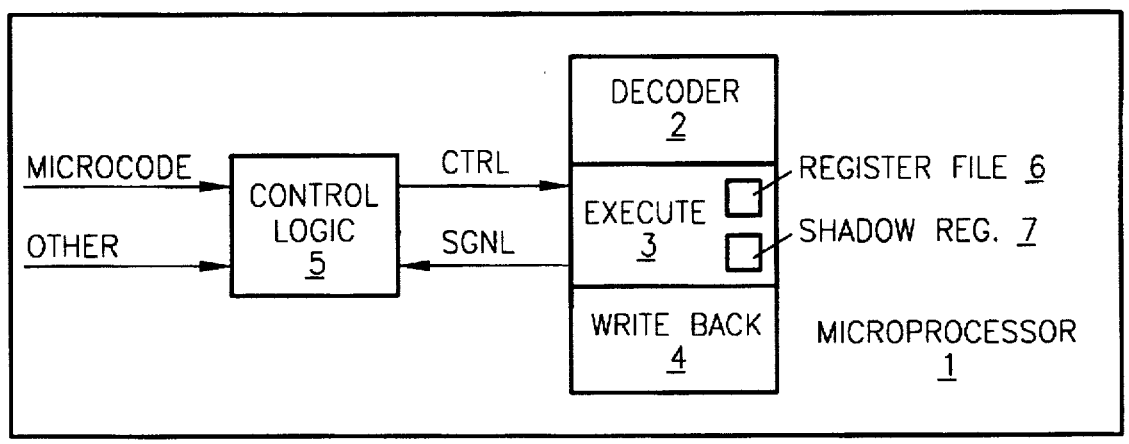
FIG. 1 is a block diagram showing portions of an integrated microprocessor system.

Referring now to FIG. 1, the preferred embodiment of the present invention is an integrated microprocessor system 1 having a pipelined architecture, wherein the pipeline includes, for example, a decoder stage 2, an execution unit 3 and a writeback stage 4. The present disclosure is directed to the execution unit 3, which provides a 32-bit data path for operands and instructions stored in general registers, including register file 6 and shadow register 7, and wherein arithmetic, logical and addressing computations are performed by the execution unit for programming instructions executed by the integrated microprocessor system 1.

The microprocessor system 1 includes a control logic unit 5 which is coupled to send control signals CTRL to the execution unit 3 and to receive data signals SGNL from the execution unit. The control logic unit 5 is also coupled to other components of the microprocessor system 1 and receives microcode and other input for making programmed control decisions.

The execution unit 3 is implemented to be substantially compatible with the Intel x86 instruction set, as set forth in the "Intel486™ MICROPROCESSOR FAMILY PROGRAMMER'S REFERENCE MANUAL," which is expressly incorporated herein by reference. The x86 instructions will be referenced herein in their common mnemonic form, such as ADD, SUB, MUL, DIV, etc.

Figure 2:
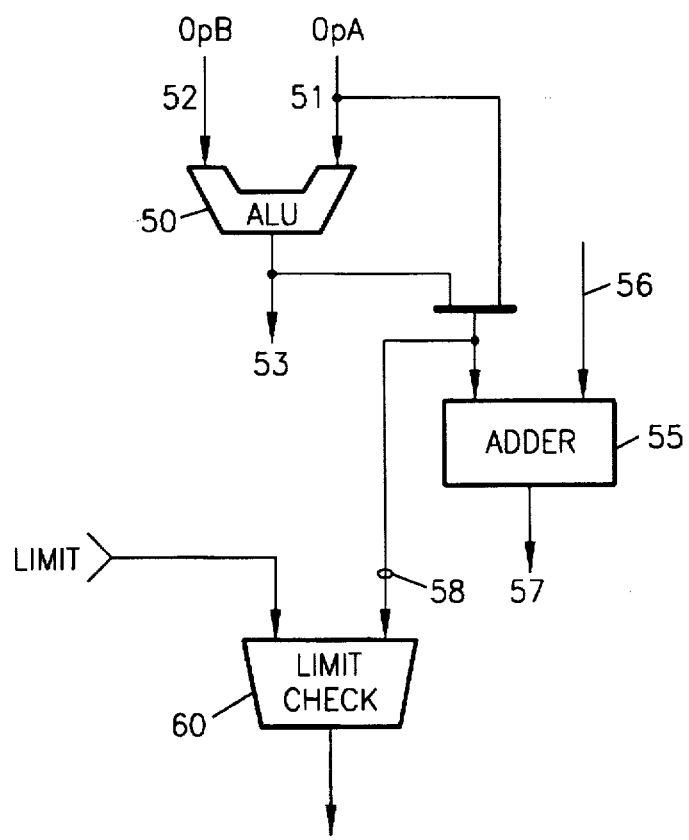
FIG. 2 is a functional block diagram of the execution unit portion of the integrated microprocessor system of FIG. 1.

A simplified functional diagram of the execution unit 3 is shown in FIG. 2. An arithmetic unit 50 has two inputs 51 and 52 for receiving operands OpA and OpB, respectively, from register file 6. The arithmetic unit 50 generates an arithmetic or logical result 53 in a single cycle for many x86 instructions.

The arithmetic unit 50 includes a first portion for performing addition, subtraction and logical operations, a second portion for performing multiply, divide and single-bit shift operations, and a third portion for performing multi-bit shift and rotate operations, as will be shown and described in more detail below.

An addressing unit 55 has one input selectively coupled to the output of the arithmetic unit 50 or to OpA. When an addressing instruction is received, the segment base component is provided to the addressing unit 55 on input 56, and the base, index, or displacement components, or immediate segment address operands, are provided to the arithmetic unit 50 on inputs 51 and 52. The addressing unit 55 then sums the address components to yield output 57 which is a linear address.

A limit check unit 60 is provided to make sure the offset 58, i.e., output 53 or OpA, is not addressing a location outside of the segment as determined by the control signal LIMIT.

Figure 3:
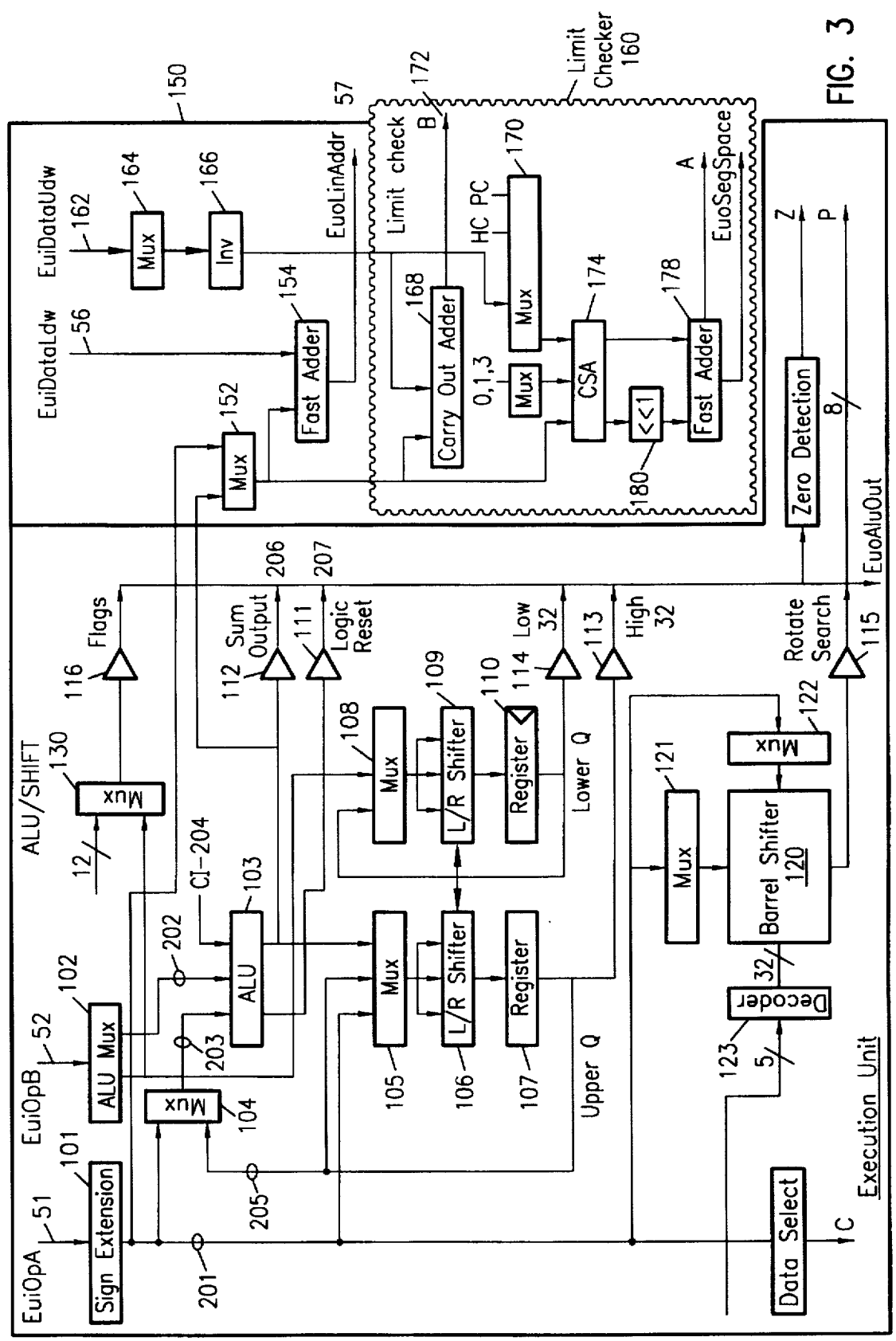
FIG. 3 is a more detailed block diagram of the execution unit of FIG. 2.
Figure 4:
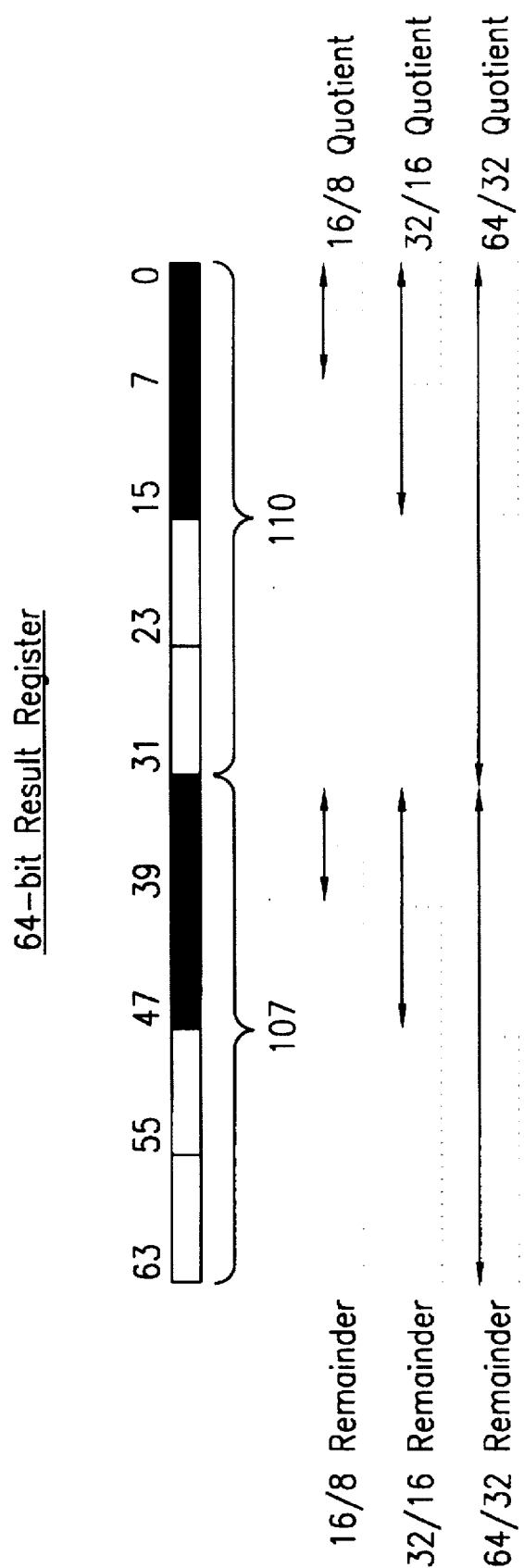
FIG. 4 is a schematic diagram of the result registers for a division operation.

Referring now to FIG. 3, the execution unit 3 is illustrated in greater detail. It should be apparent to one versed in the art that each component of the execution unit described below is controlled or selected by one or more control signals provided by the control logic unit 5. However, a detailed description of these control signals in not necessary for a complete understanding of the invention.

Operand A is received into a sign extension unit 101. Sign extension unit 101 is a 3:1 multiplexor that selects a byte and sign extends it into 32 bits, or selects a word and sign extends it into 32 bits, or selects a dword, and then outputs the 32 bit result $a_{in}$ onto data line 201. The term "sign extend" means copying the sign bit into the 24 highest order bits for a byte or into the 16 highest order bits for a word.

Operand B is received into a sign extension unit 102. Sign extension unit 102 includes a 5:1 multiplexor that selects a signed byte and sign extends it into 32 bits, or a signed word and sign extends it into 32 bits, or an unsigned byte and sign extends it into 32 bits, or an unsigned word and sign extends it into 32 bits, or a dword. The output 202 is a 32 bit result $b_{in}$. Sign extension unit 102 also includes a 2:1 multiplexor that selects OpB or its complement.

An adder 103 receives and operates upon data lines 202 and 203 and carry input CI 204. Data line 203 is from the output of a 2:1 multiplexor 104, which selects either $a_{in}$ data line 201 or UpperQ data line 205.

Adder 103 performs logical operations on data lines 202 and 203 to generate logic output 207, which is available to the user through output gate 111. The adder 103 also performs addition on data lines 202, 203 and 204 to generate sum output 206, which is available to the user through output gate 112.

Two 32 bit registers are provided for performing multiply, divide and single-bit shift operations. For the upper 32 bits, a 3:1 multiplexor 105 selects from $a_{in}$ data line 201, UpperQ data line 205, or SUM data line 207. The selected value may be shifted either left or right by one bit by left/right shifter 106 and then stored in register 107. For the lower 32 bits, a 2:1 multiplexor 108 selects from $b_{in}$ data line 202 or from LowerQ data line 208. The selected value may be shifted either left or right by one bit by left/right shifter 109 and then stored in register 110. The least significant bit (LSB) of left/right shifter 106 is coupled to the most significant bit (MSB) of left/right shifter 109 to permit up to 64 single bit position shifts.

The UpperQ register 107 provides an output data line 205 which is fed back to multiplexor 104 or multiplexor 105, as described above, or made available to the user through output gate 113. The LowerQ register 110 provides an output data line 208 which is fed back to multiplexor 108 as described above, or available to the user through output gate 114.

A barrel shifter 120 comprising a 32 by 32 transistor array is provided for performing multi-bit shift and rotate operations. A pair of 32 bit 2:1 multiplexors 121, 122 couple the $a_{in}$ data line 201 to the barrel shifter 120. A 5 bit decoder 123 provides 32 output signals, only one of which is true, to the barrel shifter 120, thus selecting one row of the barrel shifter. The output 209 of the barrel shifter 120 is available to the user through output gate 115.

A multiplexor 130 selectively outputs status flags from the execution unit 3 through output gate 116, as shown in Table I:

TABLE I

| Flag | Function |
| --- | --- |
| CF | Carry flag: Carry or Borrow from most-significant bit |
| PF | Parity Flag: Exclusive NOT of lower 8 bits of result |
| AF | Auxiliary Flag: Carry of Borrow from bit 8 |
| ZF | Zero Flag: Zero result set ZF to 1; else ZF is cleared |
| SF | Sign Flag: set to most-significant bit of result |
| OF | Overflow Flag: set to 1 is two's complement overflow occurs; else cleared |

The addressing unit includes a 4:1 multiplexor 152 that selects the $a_{in}$ data line 201 if it is a dword, or zero extends the $a_{in}$ data line 201 if it is a word, or the SUM output 206 if a dword, or zero extends the SUM output if a word. The term "zero extend" means copying a zero into the 24 highest order bits for a byte or into the 16 highest order bits for a word.

An adder 154 receives the output from multiplexor 152 as well as the segment base value on data line 56 and adds the two values together, thereby generating a linear address 57.

A limit check unit 160 is also provided in execution unit 3. The address includes a 20 bit limit value 162 which is stored in the shadow register 7. This limit value is provided to multiplexor 164, where it is scaled to 32 bits, depending on the value of the granularity bit, then inverted through 32 bit inverter 166. The output of inverter 166 is coupled to an adder 168, in which only the carry out function is used, and to a multiplexor 170. The output of multiplexor 152 is also coupled to adder 168. The output B of adder 168 indicates that the offset is below the scaled limit value.

The multiplexor 170 is provided with constants HC (half ceiling) and FC (full ceiling), which provide the maximum value for addressing computations and cause selection of either 16 bit addresses (HC) or 32 bits addresses (FC). The output of multiplexor 170, which is the upper limit for address computations, is fed to adder 174, which is a carry save adder (CSA). Additional inputs to CSA 174 are from multiplexor 152 and multiplexor 176. Additional constant inputs 0, 1 and 3 are provided to the multiplexor 176 to define the instruction length, i.e., 0=byte, 1=word, and 3=dword.

The output of CSA 174 is fed to the input of adder 178 and to a single bit left shift unit 180, which effectively multiplies the value of the carry bits by 2. The output of shift unit 180 is fed to the adder 178. The output SegSpace of adder 178 is used for a limit calculcation by a prefetch unit (not shown) and the output A of adder 178 indicates that the offset in above the scaled limit value.

The operation of execution unit 3 for arithmetic and logical instructions will now be described in more detail.

Instructions for addition, subtraction, and logical operations are carried out in a conventional manner by utilizing the resources of adder 103.

Instructions for multiplication and division are carried out by using the adder 103, the upper shifter comprising multiplexor 105, shifter 106 and register 107, and the lower shifter comprising multiplexor 108, shifter 109 and register 110. Generally, most multiplication and division instructions are performed according to conventional algorithms, i.e., shift and add for multiplication, and subtract and shift for division operations.

For a division operation, if the value of $a_{in}$ is greater than the value stored in registers 107, 110, then 0 is entered and the shifter is selected, else 1 is entered and the adder 103 is selected. For a multiplication operation, if OpA equals 1, then the adder 103 is selected, else the shifter is selected.

A division example of 50 by 7 yields a quotient of 7 with a remainder of 1, as shown in Table II (truncated to 8 bits):

TABLE II

| Cycle | Register 107 + 110 | Shifter 106 + 109 | Adder 103 |
|---|---|---|---|
| 1 | 0011 0010 | 0110 0100 | 1111 |
| 2 | 0110 0100 | 1100 1001 | 0101 |
| 3 | 0101 1001 | 1011 0011 | 0100 |
| 4 | 0100 0011 | 1000 0111 | 0001 |
| 5 | 0001 0111 | xxxx xxxx | xxxx |

Figure 5:
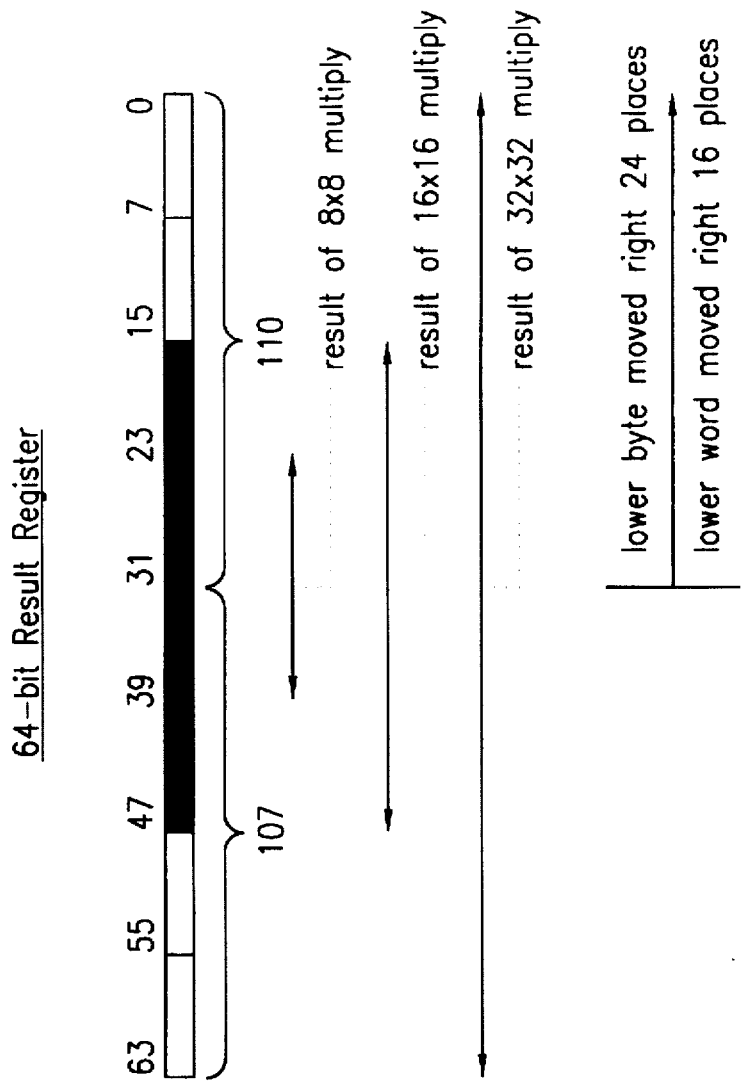
FIG. 5 is a schematic diagram of the result registers for a multiplication operation.
Figure 6A:
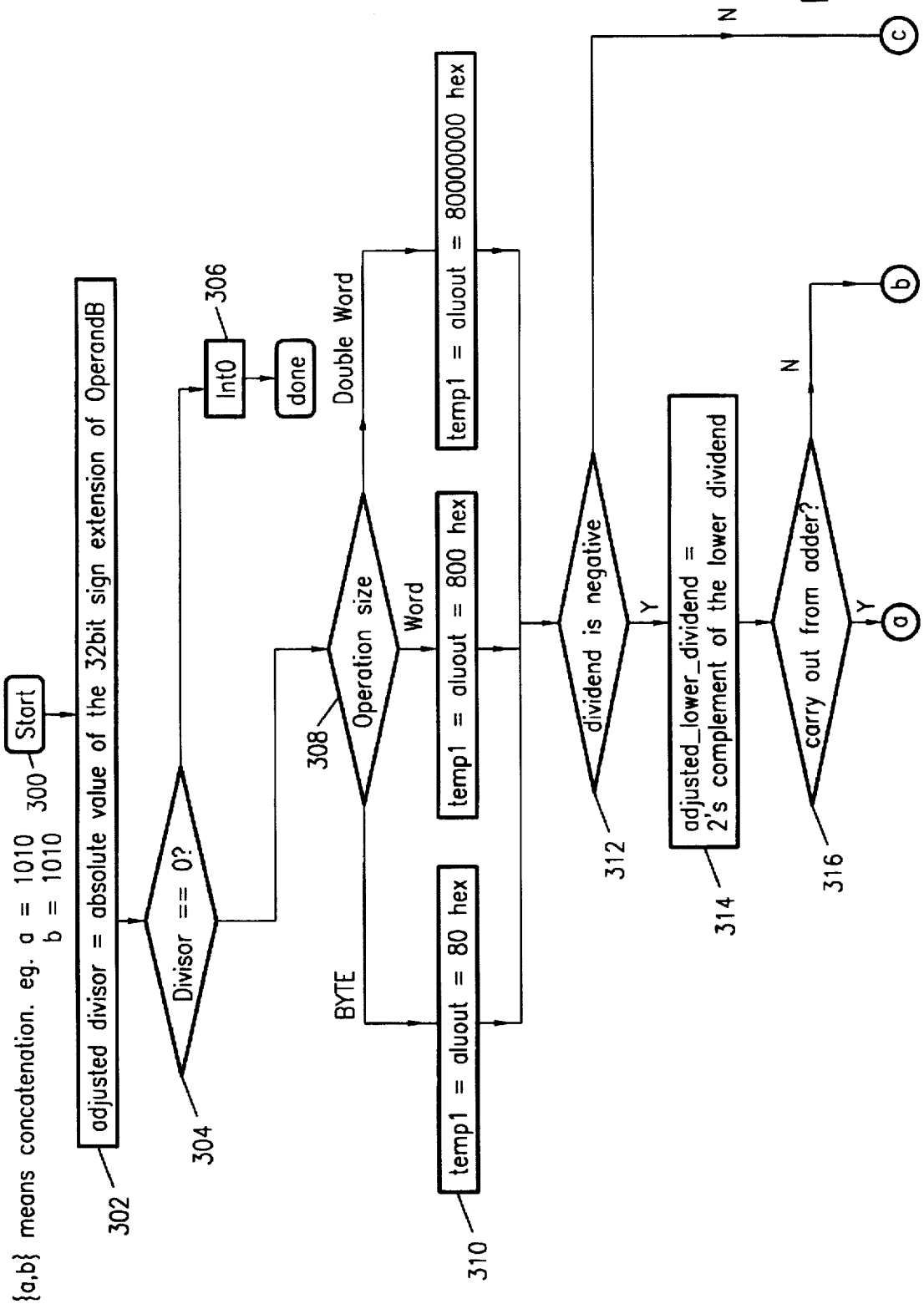
FIGS. 6a–6e are is a block diagram of a portion of the execution unit of FIG. 3.
Figure 6B:
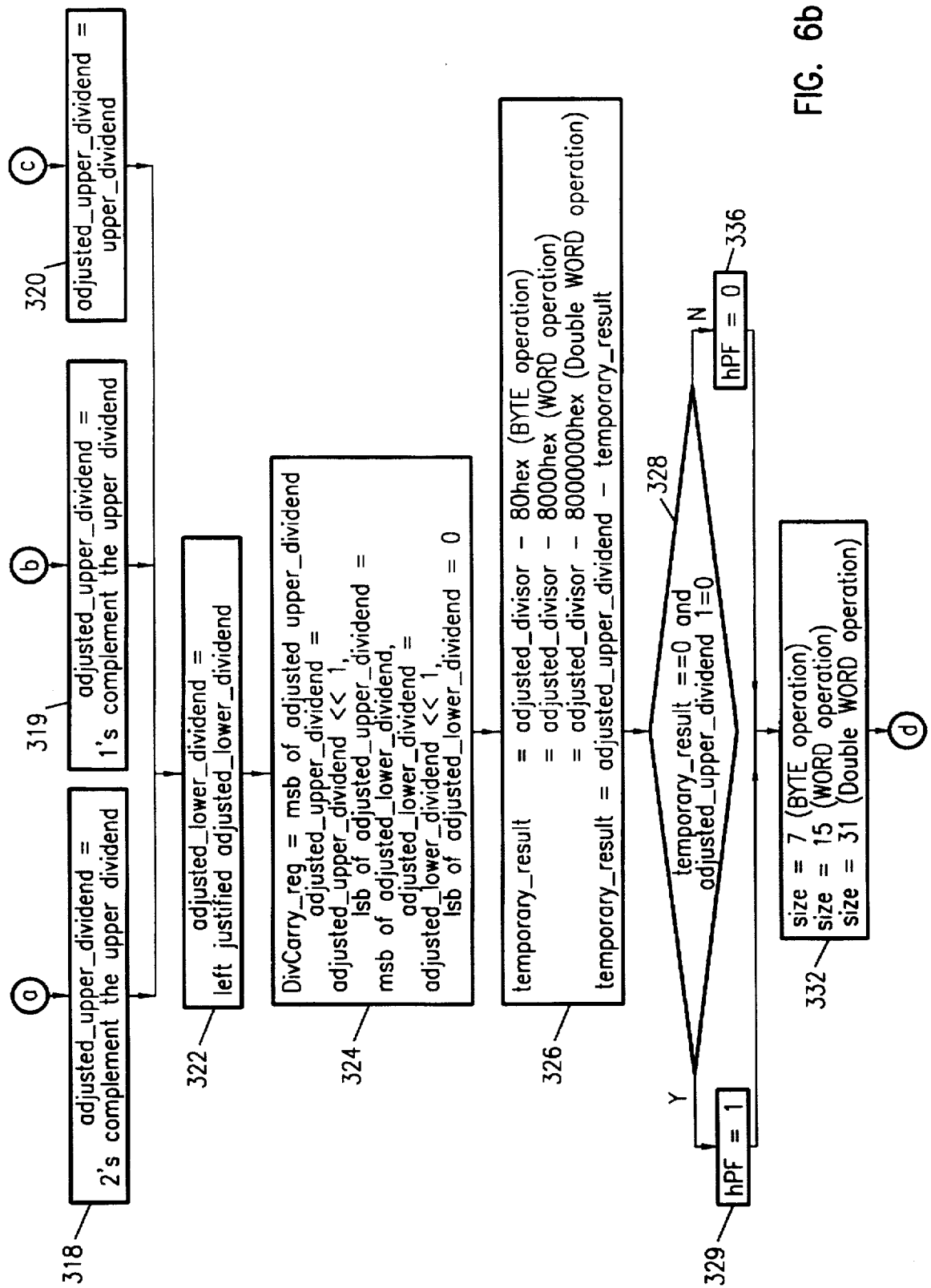
Figure 6C:
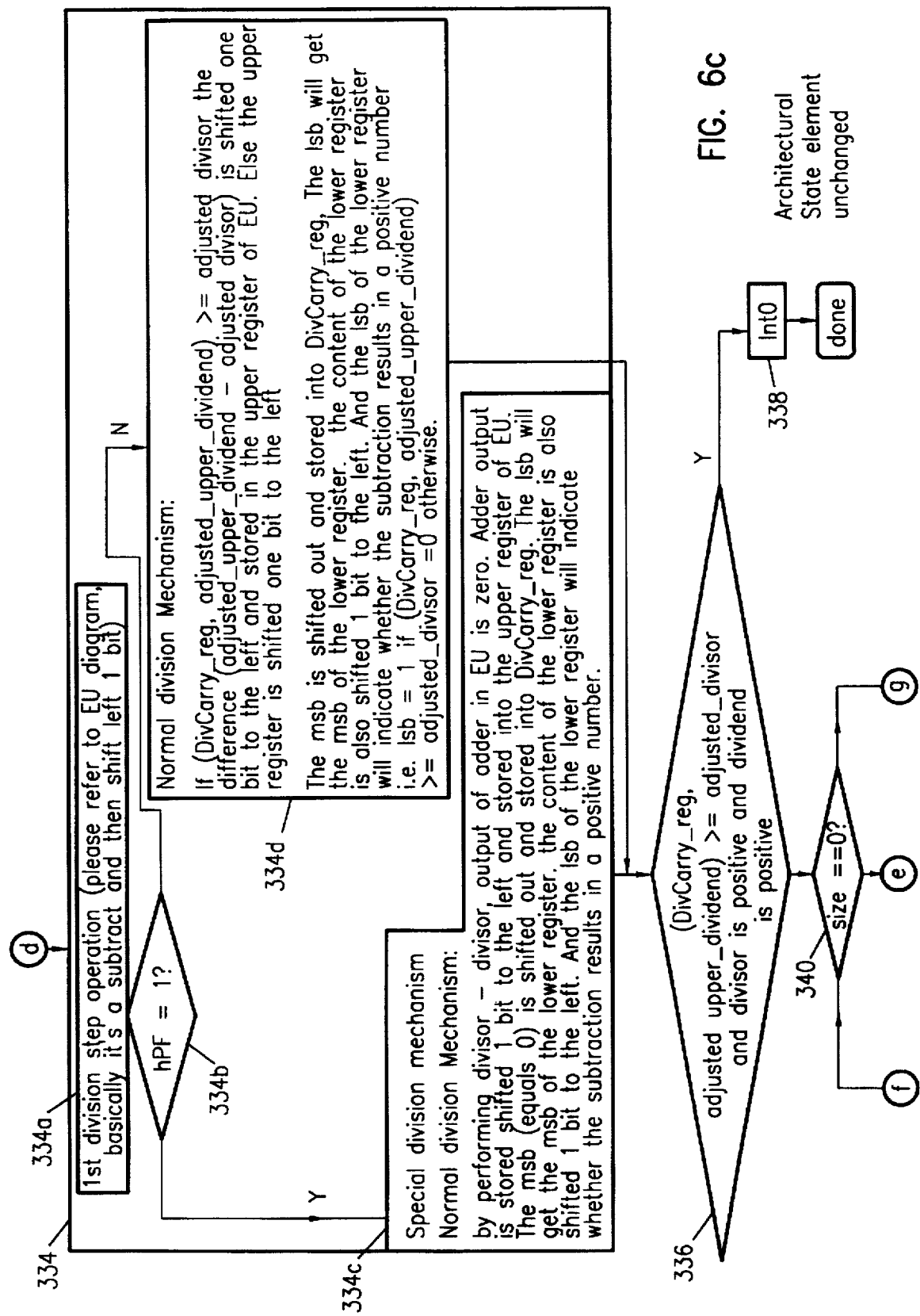
Figure 6D:
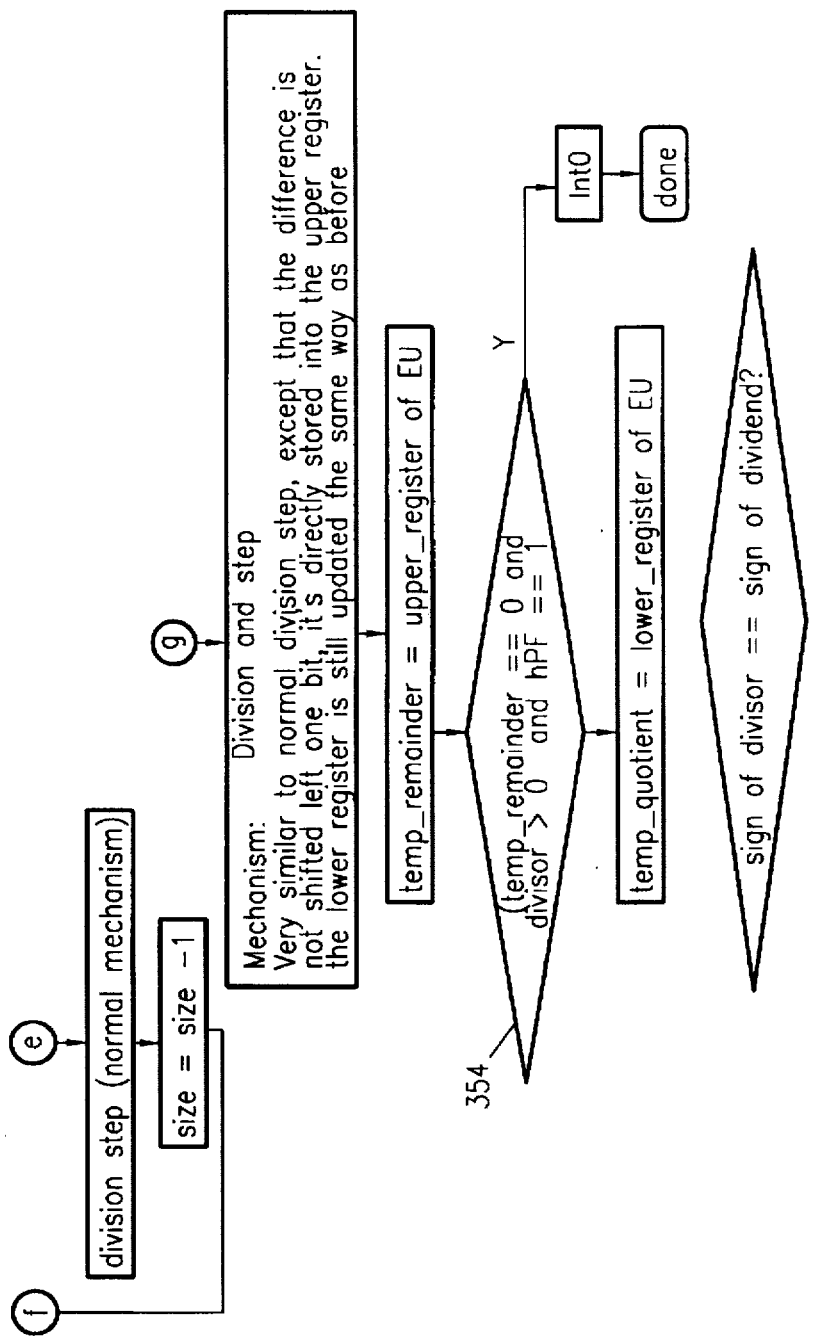
Figure 6E:
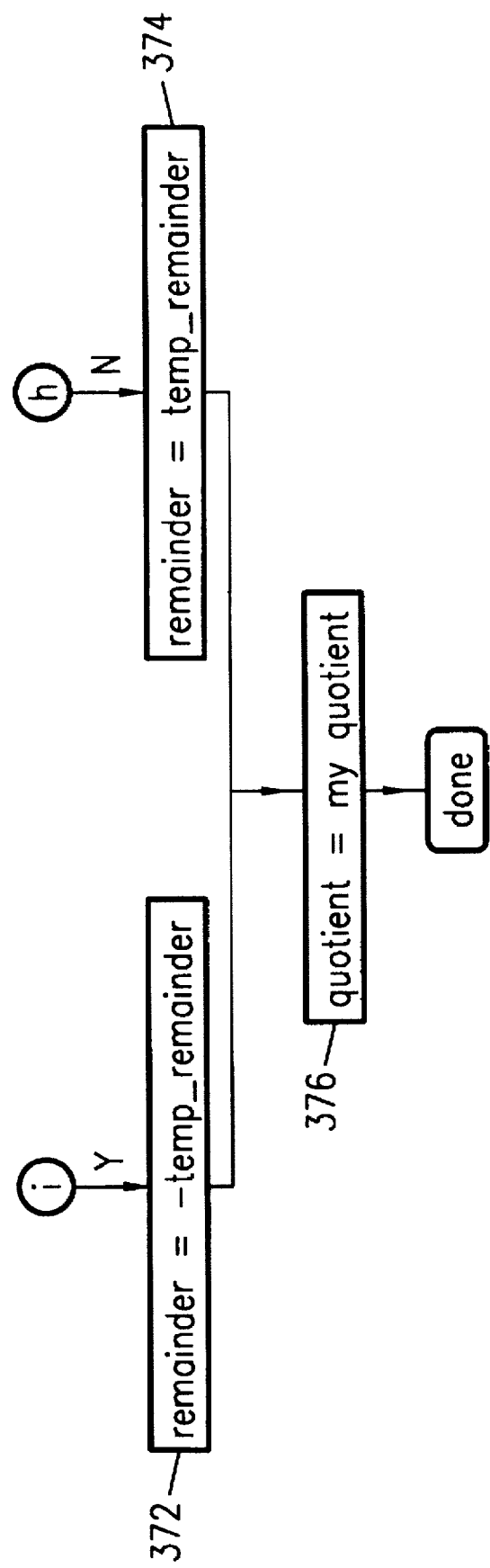

Register 110 is used to provide the quotient while register 107 is used to provide the remainder, as illustrated in FIG. 5. Thus, for byte operations, the lower 8 bits of register 110 contain the quotient while the lower 8 bits of register 107 contain the remainder. For word operations, the lower 16 bits of register 110 contain the quotient while the lower 16 bits of register 107 contain the remainder. For dword operations, all 32 bits of register 110 contain the quotient while all 32 bits of register 107 contain the remainder.

The IDIV instruction requires special attention, and will be described with reference to FIGS. 6a through 6e. In step 302, the divisor is set equal to the absolute value of the 32 bit sign extension of OpB.

In step 304, the divisor is compared to zero. If true, then an interrupt occurs in step 306 and the routine stops. If not, then the data length is determined in step 308 and a temporary register initialized in step 310. If the data length is a byte, then register temp1 is set equal to 80 hex. If the data length is a word, then register temp1 is set equal to 8000 hex. If the data length is a dword, then register temp1 is set equal to 80000000 hex.

In step 312, the dividend OpA is examined to determine if it is negative. If not, then the program jumps to step 320. Is so, then the lower dividend (register 110) is adjusted to become the two's complement value of the lower dividend in step 314.

In step 316, the adder 103 is examined to see if there is a carry out. If so, go to step 318. If not, go to step 319.

In step 318, an adjusted upper dividend is set equal to the two's complement of the upper dividend (register 107). In step 319, the adjusted upper dividend is set equal to the one's complement of the upper dividend. In step 320, the adjusted upper dividend is set equal to the upper dividend.

In step 322, the adjusted lower dividend is aligned to be left justified. In step 324, a division carry register is set equal to the most significant bit of the adjusted upper dividend, then the adjusted upper dividend is shifted left one bit position, then the LSB of the adjusted upper dividend is set equal to the MSB of the adjusted lower dividend, then the adjusted lower dividend is shifted to the left by one bit position, and finally, the LSB of the adjusted lower dividend is set equal to zero.

In step 326, a temporary result register stores the result of subtracting the value in register temp1 from the adjusted divisor. Then, the temporary result register is set equal to the adjusted upper dividend less the temporary result register.

In step 328, the temporary result and the adjusted upper register are compared to zero. If true, then the parity flag hPF is set equal to one (step 329). If not, then the parity flag hPF is set equal to zero (step 330).

In step 332, the size is defined based on the data length, i.e., a byte, a word, or a dword.

Step 334 includes several sub steps. Step 334a is the first division step and is basically a subtract then shift left. Step 334b calls for comparing the hidden parity flag hPF to 1. If true, then go to step 334c, else go to step 334d.

Step 336 checks to see if the adjusted upper dividend and the division carry register are greater than the adjusted divisor, and that the divisor and dividend are positive values. If so, then an interrupt is generated in step 338 and the routine stops. If not, then the size is compared to 0 in step 340. If true, then go to step 350. If not, go to step 342.

In step 342, a normal division operation is performed. In step 344, the size is decremented by one.

Step 350 is a division end step that is similar to the normal division step, except that the difference is not shifted left one bit, but is stored directly into the upper register 107. The lower register 110 is updated as before.

In step 352, the temporary remainder is set equal to the upper register 107. If, in step 354, the temporary remainder is 0, and the divisor is greater than 0, and Hpf equals 1, then an interrupt is generated (step 356) and the routine stops. If not, then a temporary quotient is set equal to the lower register 110 in step 358.

In step 360, the sign of the divisor is compared to the sign of the dividend. If equal, a second temporary quotient is set equal to the first temporary quotient in step 362. If not, then the second temporary quotient is set equal to the complement of the first temporary quotient in step 364.

In step 366, if the sign of the second temporary quotient is not equal to the exclusive OR of the sign of the dividend with the sign of the divisor, and the second temporary quotient is not equal to 0, then an interrupt is generated (step 368) and the routine stops. If not, then go to step 370.

The dividend is examined in step 370 to see if it is negative. If so, then the remainder is set equal to the temporary remainder in step 372. If not, then the remainder is set equal to the complement of the temporary remainder in step 374.

Finally, the quotient is set equal to the second temporary quotient in step 376.

A multiplication example of 10 by 5 yields a product of 50, as shown in Table III (truncated to 8 bits):

TABLE III

| Cycle | Register 107 + 110 | Shifter 106 + 109 | Adder 103 |
| --- | --- | --- | --- |
| 1 | 0000 0000 | 0000 0000 | 1111 |
| 2 | 1010 0000 | 0101 0000 | 0101 |
| 3 | 0101 0000 | 0010 1000 | 0100 |
| 4 | 1100 1000 | 0110 0100 | 0001 |
| 5 | 0110 0100 | 0011 0010 | 1101 |
| 6 | 0011 0010 | xxxx xxxx | xxxx |

The product of a multiplication operation is contained in registers 110 and 107 as illustrated in FIG. 5. Thus, for byte operations, a 16-bit result is contained in the upper 8 bits of register 110 and the lower 8 bits of register 107. For word operations, a 32-bit result is contained in the upper 16 bits of register 110 and the lower 16 bits of register 107. For dword operations, a 64-bit result is contained all 32 bits of register 110 and all 32 bits of register 107.

The barrel shifter 120 and associated multiplexors 121 and 122 may be used to carry out multi-bit shift and rotate operations, as is more fully described in the following commonly assigned, copending applications: U.S. application Ser. No. 08/451,444 entitled "BARREL SHIFTER" by Thomas W. S. Thomson and H. John Tam as filed on May 26, 1995; (2) U.S. application Ser. No. 08/451,204 entitled "BIT SEARCHING THROUGH 8, 16, OR 32-BIT OPERANDS USING A 32-BIT DATA PATH" by Thomas W. S. Thomson as filed on May 26, 1995; and (3) U.S. application Ser. No. 08/452,162 entitled "METHOD FOR PERFORMING ROTATE THROUGH CARRY USING A 32-BIT BARREL SHIFTER AND COUNTER" by H. John Tam as filed on May 26, 1995.

Double precision shift operations are also fully supported by the execution unit 3, as more fully described in commonly assigned, copending application entitled U.S. application Ser. No. 08/08/451,195 entitled "DOUBLE PRECISION (64-BIT) SHIFT OPERATIONS USING A 32-BIT DATA PATH" by Thomas W. S. Thomson and filed on May 26, 1995.

Addressing computations for x86 segmented address space are optimized in execution unit 3 for the predominant cases, i.e., where the address consists only of two components, namely a scaled index and a displacement, or a base and a displacement. The execution unit is capable of performing the entire address computation in a single cycle, i.e., it can perform calculate the offset, the linear address and the limit in a single cycle.

An address cycle is illustrated schematically in FIG. 7. A 32-bit segment base address is provided to input 56 and defines the memory segment space in which an operand resides. A 32-bit or 16-bit segment offset value is added to the segment base to form the linear address. The offset value is constructed from up to two general registers, namely a base register or an index register, and a literal displacement value, which is an 8-bit, 16-bit, or 32-bit value taken from the addressing instruction format. The index register can be scaled by a factor of 2, 4, or 8 before use, thereby allowing the index register to count elements rather than bytes when indexing through an array.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319 entitled DISPLAY CONTROLLER CAPABLE OF ACCESSING AN EXTERNAL MEMORY FOR GRAY SCALE MODULATION DATA; U.S. patent application Ser. No. 08/451,965, entitled SERIAL INTERFACE CAPABLE OF OPERATING IN TWO DIFFERENT SERIAL DATA TRANSFER MODES; U.S. patent application Ser. No. 08/453,076, now abandoned, entitled HIGH PERFORMANCE MULTIFUNCTION DIRECT MEMORY ACCESS (DMA) CONTROLLER; U.S. patent application Ser. No. 08/452,001, now abandoned, entitled OPEN DRAIN MULTI-SOURCE CLOCK GENERATOR HAVING MINIMUM PULSE WIDTH; U.S. patent application Ser. No. 08/451,503, now abandoned, entitled INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION; U.S. patent application Ser. No. 08/451,924, entitled EXECUTION UNIT ARCHITECTURE TO SUPPORT x86 INSTRUCTION SET AND x86 SEGMENTED ADDRESSING; U.S. patent application Ser. No. 08/451,444, entitled BARREL SHIFTER; U.S. patent application Ser. No. 08/451,204, entitled BIT SEARCHING THROUGH 8, 16, OR 32-BIT OPERANDS USING A 32-BIT DATA PATH; U.S. patent application Ser. No. 08/451,195, entitled DOUBLE PRECISION (64-BIT) SHIFT OPERATIONS USING A 32-BIT DATA PATH; U.S. patent application Ser. No. 08/451,571, entitled METHOD FOR PERFORMING SIGNED DIVISION; U.S. patent application Ser. No. 08/452,162, entitled METHOD FOR PERFORMING ROTATE THROUGH CARRY USING A 32-BIT BARREL SHIFTER AND COUNTER; U.S. patent application Ser. No. 08/451,434, entitled AREA AND TIME EFFICIENT FIELD EXTRACTION CIRCUIT; U.S. patent application Ser. No. 08/451,535, now U.S. Pat. No. 5,617,543, entitled NON-ARITHMETICAL CIRCULAR BUFFER CELL AVAILABILITY STATUS INDICATOR CIRCUIT; U.S. patent application Ser. No. 08/445,563, entitled TAGGED PREFETCH AND INSTRUCTION DECODER FOR VARIABLE LENGTH INSTRUCTION SET AND METHOD OF OPERATION; U.S. patent application Ser. No. 08/450,153, now U.S. Pat. No. 5,546,353, entitled PARTITIONED DECODER CIRCUIT FOR LOW POWER OPERATION; U.S. patent application Ser. No. 08/451,495, entitled CIRCUIT FOR DESIGNATING INSTRUCTION POINTERS FOR USE BY A PROCESSOR DECODER; U.S. patent application Ser. No. 08/451,219, now U.S. Pat. No. 5,598,112, entitled CIRCUIT FOR GENERATING A DEMAND-BASED GATED CLOCK; U.S. patent application Ser. No. 08/451,214, now U.S. Pat. No. 5,583,453, entitled INCREMENTOR/DECREMENTOR; U.S. patent application Ser. No. 08/451,150, entitled A PIPELINED MICROPROCESSOR THAT PIPELINES MEMORY REQUESTS TO AN EXTERNAL MEMORY; U.S. patent application Ser. No. 08/451,198, entitled CODE BREAKPOINT DECODER; U.S. patent application Ser. No. 08/445,569, entitled TWO TIER PREFETCH BUFFER STRUCTURE AND METHOD WITH BYPASS; U.S. patent application Ser. No. 08/445,564, entitled INSTRUCTION LIMIT CHECK FOR MICROPROCESSOR; U.S. patent application Ser. No. 08/452,306, now abandoned, entitled PIPELINED MICROPROCESSOR THAT MAKES MEMORY REQUESTS TO A CACHE MEMORY AND AN EXTERNAL MEMORY CONTROLLER DURING THE SAME CLOCK CYCLE; U.S. patent application Ser. No. 08/452,080, now abandoned, entitled APPARATUS AND METHOD FOR EFFICIENT COMPUTATION OF A 486™ MICROPROCESSOR COMPATIBLE POP INSTRUCTION; U.S. patent application Ser. No. 08/450,154, entitled APPARATUS AND METHOD FOR EFFICIENTLY DETERMINING ADDRESSES FOR MISALIGNED DATA STORED IN MEMORY; U.S. patent application Ser. No. 08/451,742, entitled METHOD OF IMPLEMENTING FAST 486™ MICROPROCESSOR COMPATIBLE STRING OPERATION; U.S. patent application Ser. No. 08/452,659, entitled A PIPELINED MICROPROCESSOR THAT PREVENTS THE CACHE FROM BEING READ WHEN THE CONTENTS OF THE CACHE ARE INVALID; U.S. patent application Ser. No. 08/451,507, now abandoned, entitled DRAM CONTROLLER THAT REDUCES THE TIME REQUIRED TO PROCESS MEMORY REQUESTS; U.S. patent application Ser. No. 08/451,420, entitled INTEGRATED PRIMARY BUS AND SECONDARY BUS CONTROLLER WITH REDUCED PIN COUNT; U.S. patent application Ser. No. 08/452,365, now U.S. Pat. No. 5,612,637, entitled SUPPLY AND INTERFACE CONFIGURABLE INPUT/OUTPUT BUFFER; U.S. patent application Ser. No. 08/451,744, entitled CLOCK GENERATION CIRCUIT FOR A DISPLAY CONTROLLER HAVING A FINE TUNEABLE FRAME RATE; U.S. patent application Ser. No. 08/451,206, entitled CONFIGURABLE POWER MANAGEMENT SCHEME; U.S. patent application Ser. No. 08/452,350, entitled BIDIRECTIONAL PARALLEL SIGNAL INTERFACE; U.S. patent application Ser. No. 08/452,094, entitled LIQUID CRYSTAL DISPLAY (LCD) PROTECTION CIRCUIT; U.S. patent application Ser. No. 08/450,156, entitled DISPLAY CONTROLLER CAPABLE OF ACCESSING GRAPHICS DATA FROM A SHARED SYSTEM MEMORY; U.S. patent application Ser. No. 08/450,726, now U.S. Pat. No. 5,541,935, entitled INTEGRATED CIRCUIT WITH TEST SIGNAL BUSES AND TEST CONTROL CIRCUITS; U.S. patent application Ser. No. 08/445,568, entitled DECODE BLOCK TEST METHOD AND APPARATUS.

It should be understood that the invention is not intended to be limited by the specifics of the above-described embodiment, but rather defined by the accompanying claims.

What is claimed is:

1. A method for performing signed integer division, comprising the sequential steps of:

a. setting a divisor equal to the absolute value of the 32 bit sign extension of a first operand;

b. comparing the divisor to zero, wherein if true, an interrupt is generated and the routine stops;

c. determining a data length and initializing a temporary register based on the result of the determination;

d. determining whether a dividend is negative, and if so, setting an adjusted lower dividend equal to the two's complement of a lower dividend, and if not, jump to step h;

e. examining an adder to see if there is a carry out, and if not, jump to step g;

f. setting an adjusted upper dividend equal to the two's complement of an upper dividend, then jump to step i;

g. setting the adjusted upper dividend equal to the one's complement of the upper dividend, then jump to step i;

h. setting the adjusted upper dividend equal to the upper dividend;

i. left justifying the adjusted lower dividend;

j. setting a division carry register equal to the most significant bit of the adjusted upper dividend;

k. shifting the adjusted upper dividend to the left by one bit position;

l. setting the least significant bit of the adjusted upper dividend equal to the most significant bit of the adjusted lower dividend;

m. shifting the adjusted lower dividend to the left by one bit position;

n. setting the least significant bit of the adjusted lower dividend equal to zero;

o. subtracting the value in the temporary register from the adjusted divisor and storing the result in a temporary result register;

p. setting the temporary result register equal to the adjusted upper dividend less the temporary result register;

q. comparing the temporary result register and the adjusted upper dividend to zero, wherein if true, a parity flag is set equal to one, and wherein if false, the parity flag is set equal to zero;

r. subtracting the divisor from the dividend then shifting the dividend to the left by one bit;

s. comparing the parity flag to one;

t. storing the shifted dividend directly into the upper dividend;

u. setting a temporary remainder equal to the upper dividend;

v. generating an interrupt if the temporary remainder is 0, and the divisor is greater than 0, and parity flag equals 1;

w. setting a first temporary quotient equal to the lower dividend;

x. comparing the sign of the divisor to the sign of the dividend, and if equal, setting a second temporary quotient equal to the first temporary quotient, and if not equal, then setting the second temporary quotient equal to the complement of the first temporary quotient;

y. generating an interrupt if the sign of the second temporary quotient is not equal to the exclusive OR of the sign of the dividend AND the sign of the divisor, and the second temporary quotient is not equal to 0;

z. examining the dividend, and if negative, then setting a remainder equal to the temporary remainder, and if not, then setting the remainder equal to the complement of the temporary remainder; and aa. setting the quotient equal to the second temporary quotient.

* * * * *